(12) United States Patent
Holmes

(10) Patent No.: US 11,207,910 B2
(45) Date of Patent: Dec. 28, 2021

(54) SECURITY DEVICE AND METHOD OF MANUFACTURE THEREOF

(71) Applicant: DE LA RUE INTERNATIONAL LIMITED, Basingstoke (GB)

(72) Inventor: Brian Holmes, Hampshire (GB)

(73) Assignee: DE LA RUE INTERNATIONAL LIMITED, Basingstoke (GB)

( * ) Notice: Subject to any disclaimer, the term of this patent is extended or adjusted under 35 U.S.C. 154(b) by 28 days.

(21) Appl. No.: 16/651,085

(22) PCT Filed: Sep. 27, 2018

(86) PCT No.: PCT/GB2018/052749
§ 371 (c)(1),
(2) Date: Mar. 26, 2020

(87) PCT Pub. No.: WO2019/064002
PCT Pub. Date: Apr. 4, 2019

(65) Prior Publication Data
US 2020/0223245 A1    Jul. 16, 2020

(30) Foreign Application Priority Data
Sep. 29, 2017    (GB) ...................... 1715808

(51) Int. Cl.
*B42D 25/373*    (2014.01)
*B42D 25/324*    (2014.01)
(Continued)

(52) U.S. Cl.
CPC ......... *B42D 25/373* (2014.10); *B42D 25/324* (2014.10); *B42D 25/328* (2014.10);
(Continued)

(58) Field of Classification Search
CPC .. B42D 25/373; B42D 25/324; B42D 25/328; B42D 25/355; B42D 25/24;
(Continued)

(56) References Cited

U.S. PATENT DOCUMENTS

2003/0194578 A1    10/2003    Tam et al.
2007/0221939 A1    9/2007    Taskar et al.
(Continued)

FOREIGN PATENT DOCUMENTS

CA    2781785 A1    6/2011
EP    0059056 A1    9/1982
(Continued)

OTHER PUBLICATIONS

Apr. 3, 2018 Combined British Search and Examination Report issued in British Patent Application No. 1715808.0.
(Continued)

*Primary Examiner* — Justin V Lewis
(74) *Attorney, Agent, or Firm* — Oliff PLC

(57) ABSTRACT

A method of forming a security device includes selectively providing a high refractive index (HRI) layer to a first outwardly facing surface of a security device substrate, the HRI layer having a substantially transparent host material and particles having a dimension along at least one axis less than 200 nm, such that they are substantially non-scattering to visible light and the HRI layer is substantially transparent to visible light, and wherein; the particles have a refractive
(Continued)

index of at least 1.8 and are present within the host material in a proportion such that the resultant refractive index of the HRI layer is at least 1.6. A corresponding security device, as well as security articles and security documents, are also disclosed.

20 Claims, 9 Drawing Sheets

(51) Int. Cl.
| | |
|---|---|
| *B42D 25/328* | (2014.01) |
| *C09D 11/037* | (2014.01) |
| *C09D 11/322* | (2014.01) |
| *C09D 11/50* | (2014.01) |
| *G03H 1/00* | (2006.01) |
| *G03H 1/02* | (2006.01) |
| *B42D 25/24* | (2014.01) |
| *B42D 25/355* | (2014.01) |
| *B42D 25/29* | (2014.01) |
| *B42D 25/425* | (2014.01) |

(52) U.S. Cl.
CPC .......... *B42D 25/355* (2014.10); *C09D 11/037* (2013.01); *C09D 11/322* (2013.01); *C09D 11/50* (2013.01); *G03H 1/0011* (2013.01); *G03H 1/0244* (2013.01); *B42D 25/24* (2014.10); *B42D 25/29* (2014.10); *B42D 25/425* (2014.10)

(58) Field of Classification Search
CPC ..... C09D 11/037; C09D 11/322; C09D 11/50; G03H 1/0011; G03H 1/0244; G03H 1/00; G03H 1/02
USPC .................... 283/67, 70, 72, 74, 94, 98, 901
See application file for complete search history.

(56) References Cited

U.S. PATENT DOCUMENTS

| | | | |
|---|---|---|---|
| 2010/0109317 A1* | 5/2010 | Hoffmuller | .......... G02B 3/0012 283/91 |
| 2012/0141780 A1 | 6/2012 | Konno et al. | |

FOREIGN PATENT DOCUMENTS

| | | | |
|---|---|---|---|
| EP | 724519 | B1 | 7/1997 |
| EP | 0860298 | A2 | 8/1998 |
| EP | 1141480 | B1 | 2/2004 |
| EP | 1398174 | A1 | 3/2004 |
| EP | 723501 | B2 | 5/2005 |
| EP | 2891685 | A1 | 7/2015 |
| GB | 2493856 | A | 2/2013 |
| GB | 2493856 | B | 7/2017 |
| JP | 2008-207337 | A | 9/2008 |
| WO | 83/00659 | A1 | 3/1983 |
| WO | 00/39391 | A1 | 7/2000 |
| WO | 03/054297 | A2 | 7/2003 |
| WO | 03/095188 | A2 | 11/2003 |
| WO | 2011/004750 | A1 | 1/2011 |
| WO | 2011/0049676 | A1 | 4/2011 |
| WO | 2011/116419 | A1 | 9/2011 |
| WO | 2012/176126 | A1 | 12/2012 |

OTHER PUBLICATIONS

Nov. 19, 2018 Interational Search Report issued in International Patent Application No. PCT/GB2018/052749.

* cited by examiner

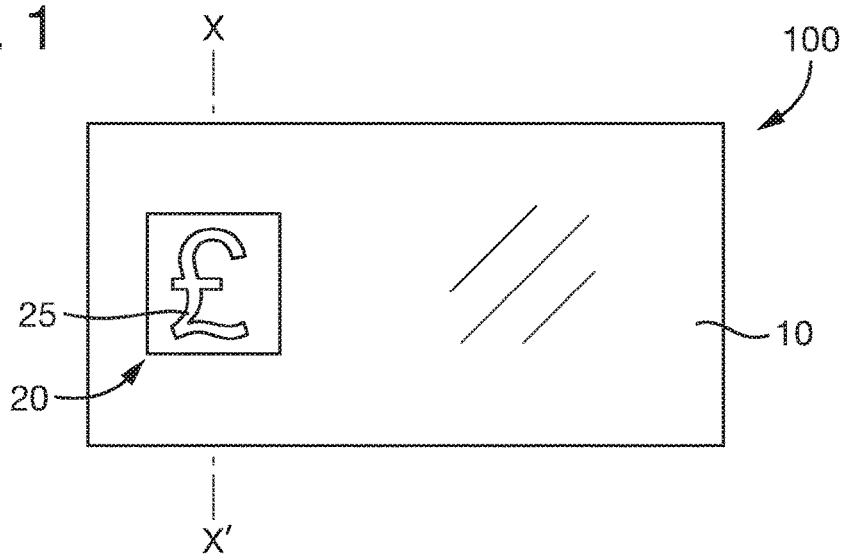
Fig. 1
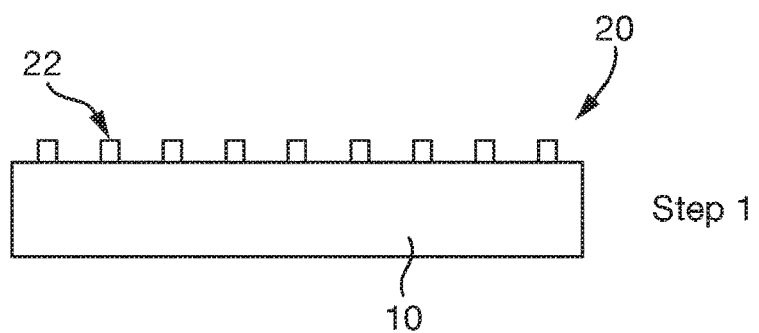
Fig. 2a — Step 1
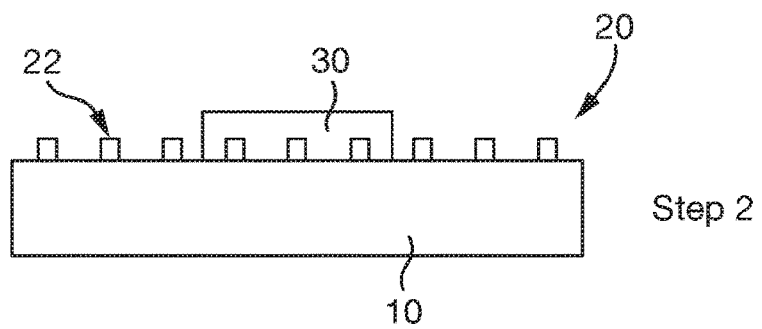
Fig. 2b — Step 2
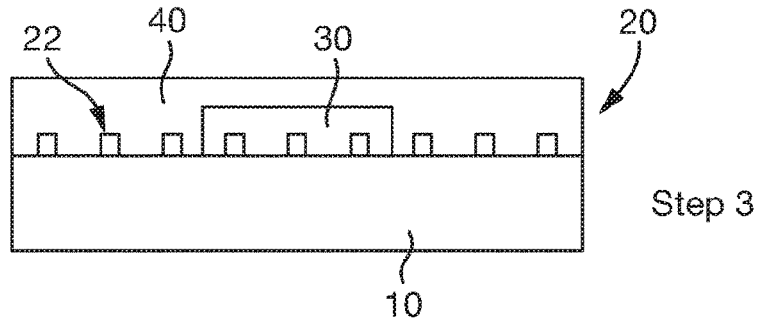
Fig. 2c — Step 3

Reflection

Reflection

Transmission

SECURITY DEVICE AND METHOD OF MANUFACTURE THEREOF

FIELD OF THE INVENTION

The present invention relates to security devices suitable for use in security documents such as banknotes, identity documents, passports, certificates and the like, as well as methods for manufacturing such security devices.

BACKGROUND TO THE INVENTION

To prevent counterfeiting and to enable authenticity to be checked, security documents are typically provided with one or more security devices which are difficult or impossible to replicate accurately with commonly available means such as photocopiers, scanners or commercial printers.

One well known type of security device is a diffractive device comprising a diffractive surface relief structure, such as a diffraction grating or hologram. The majority of diffractive security devices are in the form of applied foils and have the entirety of their diffractive relief structure coated with a layer of reflective metal (such as aluminium or copper), or a high refractive index (HRI) metal oxide coating. These coatings are typically provided by vacuum coating using methods such as sputtering, electron beam evaporation or resistance boat evaporation. The transfer of the device to the host substrate requires the use of specialist application equipment, and restricts the location of the device to a specific area on the host substrate.

It would be advantageous to increase the ease and flexibility of providing such diffractive devices to a host substrate. Furthermore, in order to further improve the security of such devices, it would be advantageous to provide unique (or "personalised") diffractive security devices, in order to further increase the difficulty of counterfeiting. However, although efforts have been made to provide personalisation for diffractive security devices, these have been on the whole unsatisfactory.

There has been recent interest in so-called "printed" holograms, where metallic inks are provided to a surface relief structure by analogue printing techniques such as flexography or gravure, or via toner transfer or cold transfer where an adhesive is printed before application of a foil. However, diffractive security devices manufactured in this way have an undesirable metallic reflective appearance, and are inherently susceptible to replication by laser reactive foils widely available within the graphics industry. GB-A-2493856 discloses the use of printing a high refractive index protective coating over an entire diffractive surface relief with the aim of preventing contact copying by providing a flat surface over the relief.

Laser ablation of metallised foil diffractive security devices is another technique that may be used to provide personalisation. However, this is difficult and time consuming to do, and is not applicable to transparent holograms where the diffractive effect is visible in both reflection and transmission (and which are desirable as they can be applied over forms of identification data, for example).

There is therefore a need in the art to increase the ease of manufacturing unique, personalised security devices.

SUMMARY OF THE INVENTION

In accordance with a first aspect of the invention there is provided a method of forming a security device, the method comprising: selectively providing a high refractive index (HRI) layer to a first outwardly facing surface of a security device substrate, the HRI layer comprising a substantially transparent host material and particles having a dimension along at least one axis less than 200 nm, preferably less than 100 nm, such that they are substantially non-scattering to visible light and the HRI layer is substantially transparent to visible light, and wherein; the particles have a refractive index of at least 1.8 and are present within the host material in a proportion such that the resultant refractive index of the HRI layer is at least 1.6.

The method according to the first aspect of the invention overcomes the problems outlined above in the background to the invention section. The selective provision of the HRI layer overcomes the problems associated with current "printed" techniques, and allows a high degree of personalisation to be provided to the security device.

Preferably, the first outwardly facing surface of the security device substrate comprises a surface relief structure and the HRI layer is selectively provided to said surface relief structure. The expression "surface relief" is used to refer to a non-planar part of the outwardly facing surface of the security device substrate, and typically defines a plurality of elevations and depressions. Where the first outwardly facing surface of the security device substrate comprises a surface relief structure, the security device substrate may comprise a support layer and a surface relief structure layer within which the surface relief structure is formed. The surface relief structure of the surface relief structure layer then forms part of the outwardly facing surface of the security device substrate. Such a surface relief structure layer may comprise an embossing material into which the surface relief structure is embossed.

Within this invention the "security device substrate" may be considered as a "precursor" to the finished security device.

In particularly advantageous embodiments, the surface relief structure is a diffractive surface relief structure. The diffractive surface relief structure may be a diffraction grating (such as a square grating, sinusoidal grating, sawtooth grating or blazed grating), a hologram surface relief or another diffractive device that exhibits different appearances, e.g. diffractive colours and holographic replays, at different viewing angles. For the purposes of this specification, such surface relief structures will be referred to as diffractive optically variable image devices (DOVIDs).

The selective provision of the HRI layer to such a surface relief is particularly advantageous as the region(s) in which the HRI layer is applied exhibits bright diffractive replay. The HRI layer can therefore be selectively provided in the form of indicia, such that when the security device is viewed, the bright diffractive replay exhibited to the viewer is in the form of the indicia. The HRI layer may be selectively provided so as to define indicia, preferably a letter, digit, geometric shape, image, graphic or alphanumeric text. The indicia may define information. The invention is particularly advantageous when the HRI layer is provided by inkjet printing, which allows for high speed, high resolution provision of personalised security devices.

For example, it is envisaged that a plurality of security device substrates may be provided, each with the same pre-formed surface relief structure, which may be formed by methods known in the art such as stamping or embossing. Each security device substrate may then be provided with an HRI layer having a different form such that each finished security device exhibits a different effect to a viewer.

Preferably, the resultant refractive index of the HRI layer is greater than the refractive index of the security device substrate by at least 0.2, more preferably by at least 0.3. Where the security device substrate comprises a surface relief structure and the HRI layer is selectively provided to said surface relief structure, the resultant refractive index of the HRI layer is greater than the refractive index of the surface relief structure by at least 0.2, more preferably by at least 0.3.

The high refractive index property of the HRI layer is provided by the particles having a refractive index of at least 1.8. Preferably, the particles have a refractive index in the range of 1.8 to 2.9, preferably in the range of 2.0 to 2.5. Due to the presence of the particles having a high refractive index, the resultant refractive index of the HRI layer is at least 1.6. Typically, the host material has a refractive index in the range of 1.3 to 1.8, preferably 1.4 to 1.6, and the particles are present in a proportion such that the resultant refractive index of the HRI layer is in the range of 1.6 to 2.5, preferably 1.7 to 2.2. Therefore, the material forming the HRI layer typically comprises 1 to 75%, preferably 5 to 50% and more preferably 15 to 20% by weight of the high refractive index particles.

The particles are typically provided as a dispersion within said host material. The particles are typically nanocrystalline particles.

The particles comprise at least one metal oxide selected from: titanium dioxide, alumina, zirconia, zinc oxide, or mixed oxides thereof. Titanium dioxide is a particularly preferred metal oxide, and has a high refractive index of ~2.9 at 550 nm. Titanium dioxide particles may be provided in anatase or rutile form.

It will be appreciated that the particles may typically not be perfectly spherical. The particles have a dimension along at least one axis (which may be a diameter for a perfectly spherical particle) substantially less than the scattering dimension, which according to Weber's formula, gives the maximum scattering efficiency of a particle. Preferably the particles have a dimension along at least one axis of less than 50 nm.

$$D=2\lambda/\pi(n1-n2),\quad\text{Weber's formula:}$$

where n1 is the refractive index of the particles, n2 is the refractive index of the host material, and $\lambda$ is the wavelength of the incident light, gives a dimension D of particles required for optimal scattering power. Taking Titanium dioxide as an example, for visible light, particles having dimension of 170-280 nm along at least one axis scatter light most efficiently for blue through to red wavelengths where there is a refractive index difference of 1.5 between the particles and the host material.

However, below 200 nm, preferably below 100 nm and more preferably below 50 nm, the scattering power of the particles in the HRI layer progressively reduces to zero, meaning that the visible light incident on the HRI layer is able to be transmitted. Therefore the HRI layer, through the inclusion of the particles, advantageously acquires a high refractive index whilst also remaining substantially transparent to visible light (as the host material is also substantially transparent to visible light), here meaning that visible light is able to pass through it. The term "transparent" may also include "translucent". Where the first outwardly facing surface of the security device substrate comprises a diffractive surface relief structure, the transparent nature of the HRI layer advantageously allows the optical effect provided by the surface relief structure to be maintained, and viewed in both reflection and transmission.

The particles may have an elongate geometry (such as in the form of a "rod") having a dimension along at least one axis of less than 200 nm, preferably less than 100 nm and more preferably less than 50 nm, and are orientated such that they are substantially non-scattering to visible light (i.e. orientated such that light is incident upon a particle facet having a dimension along at least one axis of less than 200 nm, preferably less than 100 nm and more preferably less than 50 nm).

Typically, the particles have an average particle size (which for the purposes of this specification may be an average particle diameter or average particle dimension) of less than 200 nm, preferably less than 100 nm and more preferably less than 50 nm. The average particle size is preferably substantially less than the scattering dimension given by Weber's formula.

Typically the thickness of such a HRI layer is of the order of 1 µm or less.

Throughout this specification, the term "visible light" refers to light having a wavelength within the visible spectrum, which is approximately 400 to 750 nm. It is most preferable that the visible light is white light, i.e. contains all the visible wavelengths in more or less even proportion. It is however envisaged that non-visible light, such as light in the infra-red or UV regions of the electromagnetic spectrum, may be incident on the HRI layer.

Throughout this specification, the term "viewing in reflection" refers to viewing the security device with both the viewer and the light source positioned on the same side of the device. The term "viewing in transmission" refers to viewing the device with the viewer and the light source positioned on opposing sides of the device. Although in practice viewing in reflection under ambient lighting conditions may exhibit some transmissive effects, and conversely viewing in transmission under ambient lighting conditions may exhibit some reflection effects, for the purposes of this specification, these are substantially ignored.

The selectively providing the HRI layer is preferably performed by a printing process, typically by one of inkjet printing, flexographic printing or gravure printing. The use of a digital printing process such as inkjet printing is particularly advantageous as it allows ease of personalisation of the security device, and also enables fast, high resolution selective provision of the HRI layer. For inkjet printing, the host material comprises a carrier fluid acting as a suitable delivery host, preferably a volatile organic compound such as nitrocellulose, acrylics, cellulose acetate butyrate, vinyl chloride copolymers, and polyvinylbutyrate. As well as the particle dimension along at least one axis allowing for a substantially transparent HRI layer, the dimension along at least one axis of less than 200 nm, preferably less than 100 nm and more preferably less than 50 nm is an order of magnitude smaller than typical inkjet printer nozzle aperture sizes (which are of the order ~10 µm) and therefore do not substantially affect the rheology of the flow through the nozzle.

Alternatively, the host material may comprise a suitable clear ink or coating to allow selective provision of the HRI layer by analogue printing methods such as flexography and gravure. Suitable materials for such inks or coatings include vinyl resins such as UCAR™ VMCA Solution Vinyl Resin or UCAR™ VCMH Solution Vinyl Resin, both of which are supplied by The Dow Chemical Company and which are carboxy-functional terpolymers comprised of vinyl chloride, vinyl acetate and maleic acid The HRI layer may be substantially colourless. In alternative embodiments, the HRI layer further comprises a colourant such that the HRI layer exhibits a first colour to a viewer. The colour exhibited by a coloured region of the HRI layer is due to the absorption, by the colourant, of a particular wavelength, or range of wavelengths, of visible light, and the colour is exhibited when viewed in either reflection or transmission. The colourant used in a coloured region of the HRI layer may be a pigment or a dye. The use of such a colourant advantageously allows the security device to exhibit a coloured "tint" in the region(s) where the HRI layer has been selectively provided.

In embodiments, the HRI layer may further comprise a dispersion of scattering particles having a dimension along at least one axis such that the HRI layer exhibits a first colour when viewed in reflection and a second, different colour when viewed in transmission. The exhibition of different colours when viewed in transmitted and reflected light is a result of scattering of the incident light by the scattering particles. The scattering particles preferably have a dimension along at least one axis of the order of that of the incident light, and are preferably chosen such that they exhibit the Tyndall effect. Although it is envisaged that particles exhibiting other scattering effects may be used (for example Rayleigh scattering), Tyndall scattering is preferred as the optical effects are easily perceived. Preferably the individual scattering particles of the dispersion have a dimension along at least one axis (and typically an average particle size) in the range of 100 nm to 900 nm and more preferably 200 nm to 700 nm. The dispersion of scattering particles is preferably a colloidal dispersion.

Preferably the individual particles of the dispersion have a dimension D along at least one axis substantially according to $$D=2\lambda/\pi(n_1-n_2);$$

wherein $\lambda$ is the wavelength of light incident on the HRI layer, $n_1$ is the refractive index of the particles and $n_2$ is the refractive index of the host material, and have a dimension along at least one axis so as to provide a significant difference between red and blue scattering efficiency in order to exhibit the different effects in reflection and transmission.

Under the Tyndall effect, the scattering power of the scattering particles is proportional to the fourth power of the frequency of incident light, and so incident light having a shorter wavelength is more strongly scattered by the scattering particles. This means that shorter wavelength light is more reflected by the HRI layer, and longer wavelength light is more transmitted. For the case of visible light incident on an HRI layer comprising such a dispersion of scattering particles, this means that in reflected light the HRI layer exhibits a blue colour (i.e. shorter wavelengths of the visible spectrum) and in transmitted light the HRI layer exhibits an orange colour (i.e. longer wavelengths of the visible spectrum). This change in colour provides a striking optical effect to a viewer.

Examples of materials that may be used in particulate form to exhibit the Tyndall effect include materials that follow Weber's law of scattering efficiency, for example the metal oxides (titanium dioxide, alumina, zirconia, zinc oxide, or mixed oxides thereof) discussed above. Other materials may be used as would be understood by those skilled in the art. A dispersion of transition metal nanoparticles may be used in order to exhibit the "inverse-Tyndall" effect, as is described in Canadian patent application CA2781785.

Where the HRI layer comprises scattering particles, it remains substantially transparent to visible light.

In embodiments, the method may further comprise selectively providing an optical effect layer to the HRI layer. The optical effect layer may comprise a colourant such that the optical effect layer exhibits a first colour to a viewer in the same manner as described above.

The optical effect layer may comprise a dispersion of scattering particles having a dimension along at least one axis such that the optical effect layer exhibits a first colour when viewed in reflection, and a second, different colour when viewed in transmission in the same manner as described above. Preferably the individual scattering particles of the dispersion have a dimension along at least one axis (and typically an average particle size) in the range of 100 nm to 900 nm, preferably in the range of 200 nm to 700 nm.

Preferably the individual particles of the dispersion have a dimension D along at least one axis substantially according to $$D=2\lambda/\pi(n_1-n_2);$$

wherein $\lambda$ is the wavelength of light incident on the optical effect layer, $n_1$ is the refractive index of the particles and $n_2$ is the refractive index of a host material of the optical effect layer.

The optical effect layer may comprise a dispersion of transition metal nanoparticles in order that it exhibits the inverse Tyndall effect, as explained above.

The optical effect layer is typically selectively provided so as to at least partially overlap with the HRI layer. In other words the optical effect layer typically covers at least a part of the material of the HRI layer.

Although it is envisaged that in most cases the optical effect layer will be provided to a substantially colourless HRI layer in order to provide a resultant coloured optical effect, the optical effect layer may also be selectively provided to an HRI layer comprising a colourant or dispersion of scattering particles such that the overall effect exhibited to a viewer comprises the resultant (or "mixing") of the coloured effects exhibited by the HRI layer and the optical effect layer.

Advantageously, the optical effect layer may be selectively provided so as to define indicia, preferably a letter, digit, geometric shape, image, graphic or alphanumeric text. The indicia may define information. The optical effect layer may be selectively provided by digital printing means, such as inkjet printing, or by analogue printing processes such as flexography or gravure.

The optical effect layer is substantially transparent to visible light.

As has been described above, the first outwardly facing surface of the security device substrate may comprise a diffractive surface relief structure, with the HRI layer selectively provided to said surface relief. In other embodiments, the first outwardly facing surface of the security device substrate may comprise a refractive surface relief structure, and the HRI layer is selectively provided to said refractive surface relief structure. The first outwardly facing surface of the security device may comprise at least one refractive structure such as a lens or microprism and the HRI layer is selectively provided to said at least one refractive structure. Here the term "refractive structure" refers to a structure that provides an optical effect primarily through refractive effects. For example, the HRI layer may be provided so as to form a high refractive index coating on underpowered lenses. The at least one refractive structure is typically provided as an array. For example, the HRI layer may be selectively provided to an array of lenses or other refractive structures such as prisms.

Preferably, the security device substrate comprises a surface relief structure, and the HRI layer is selectively provided to the surface relief structure. The surface relief structure may be a diffractive surface relief structure such as a diffraction grating, or may be a refractive surface relief structure comprising at least one refractive structure such as a lens or microprism.

Typically, the HRI layer is selectively provided to the surface relief structure so as to cover less than 100% of the areal region of the surface relief structure, typically less than 90%, more typically less than 75% and even more typically less than 50%.

As described above, the HRI layer may be selectively provided to a surface relief structure. Alternatively or in addition, the HRI layer may be selectively provided in the form of a surface relief. In this case, the HRI layer is typically selectively provided to a planar part of the outwardly facing surface of the security device. The surface relief formed by the HRI layer may be a diffractive surface relief structure such as a DOVID, which advantageously removes the requirement for additional HRI coatings.

The surface relief structure formed by the HRI layer may comprise at least one refractive structure such as a lens or microprism. Other examples of refractive structures that may be formed by the HRI layer include corner cubes and pyramidal structures. Such refractive structures are typically provided as an array. The pitch of such an array (e.g. the width of a microprism) is preferably in the range of 1-100 μm, more preferably 5-70 μm, and the height of the surface structure (e.g. the height of a microprism) is preferably in the range of 1-100 μm, more preferably 5-40 μm.

Such refractive structures formed by the selective provision of the HRI layer may be subsequently varnished or coated without the requirement for low refractive index overcoats, which are difficult and expensive to produce.

Where the HRI layer is selectively provided in the form of a surface relief, the host material may comprise an embossing resin, and said surface relief is formed by embossing. Here, the HRI layer is firstly selectively provided to the security device substrate (for example in a desired region(s)) before being embossed to form the required surface relief structure. The HRI layer may be firstly selectively provided by digital printing means such as inkjet printing, or by analogue means such as flexography or gravure. Examples of suitable embossing resins include any thermoplastic polymer for example a PMMA based resin.

In some embodiments, the host material is radiation curable, preferably by UV radiation, and the surface relief is formed by cast curing. The radiation used to effect curing in the examples described above is typically UV radiation but could comprise electron beam, visible, or even infra-red or higher wavelength radiation, depending upon the material, its absorbance and the process used. Examples of suitable curable materials to which HRI particles may be provided include UV curable acrylic based clear embossing lacquers or those based on other compounds such as nitro-cellulose. The curable material could be elastomeric and therefore of increased flexibility. An example of a suitable elastomeric curable material is aliphatic urethane acrylate (with suitable cross-linking additive such as polyaziridine).

The method may further comprise providing a substantially transparent protective layer to the HRI layer so as to cover at least a part of the HRI layer. Such a substantially transparent layer may comprise an adhesive. Examples of suitable materials for the protective layer include components such as urethanes, methacrylates and carboxy-functional terpolymers (such as UCAR™ VMCH and VMCA).

In particularly advantageous embodiments, at least a region of the security device substrate is substantially transparent. Where the first outwardly facing surface of the security device substrate comprises a surface relief structure (either pre-formed or formed by the HRI layer itself), the substantially transparent region of the security device substrate is in register with the surface relief structure. This is particularly advantageous for the personalisation of "transparent" DOVIDs, whose optical effects are visible in both reflection and transmission. The selective provision of the HRI layer to such a surface relief structure enables the optical effects of the DOVID to be seen, in the region(s) of the HRI layer, in both reflection and transmission. The is a particular advantage over state-of-the-art personalisation methods using laser ablation of metal foils, as this technique is not applicable to transparent DOVIDs.

The security device substrate may comprise one of a security thread, strip, patch, label, transfer foil, paper substrate or a polymer substrate, thereby forming a security article. In such a case, the resultant security article may be integrated into a security document, for example in a transparent window region of the document, or inserted as a window thread. In particularly advantageous embodiments, the security device substrate comprises a polymer substrate of a passport data page or banknote, and the HRI layer is selectively provided directly to said polymer substrate which has been pre-formed with a diffractive surface relief structure. This beneficially allows for simple personalisation of the final security document (i.e. passport or banknote).

Examples of polymer substrates include but are not limited to, polypropylene, polyethylene, polycarbonate, polyvinyl chloride (PVC) and polyethylene terephthalate (PET).

In embodiments, the security device formed by the method of the first aspect is unique.

In accordance with a second aspect of the present invention there is provided a method of manufacturing a plurality of security devices, wherein each security device is manufactured according to the method of the first aspect, and wherein the HRI layer is selectively provided in a different form for at least two of the plurality of security devices.

In accordance with a third aspect of the present invention, there is provided a method of forming a security document, the method comprising the method of the first aspect, wherein the security device substrate comprises at least a part of a substrate of the security document. In other words, the security device substrate may form a part of the substrate of the security document.

In embodiments, the security document is a banknote and the security device substrate comprises a paper or polymer substrate of the banknote. In embodiments the security document is a passport or identification card and the security device substrate comprises a polymer substrate of the passport or identification card.

In an aspect of the invention, there is provided a method of manufacturing a plurality of security documents, wherein each security document comprises a security device manufactured according to the first aspect, or each security document is manufactured in accordance with the third aspect, and wherein the HRI layer is selectively provided in a different form on at least two of the plurality of security documents.

In an aspect of the invention, there is provided a method of manufacturing a plurality of security documents, the method of manufacturing each document comprising the steps of: providing a security document substrate comprising a diffractive or refractive surface relief structure, and; selectively providing a high refractive index (HRI) layer to said diffractive or refractive surface relief structure, the HRI layer comprising a substantially transparent host material and particles having a dimension along at least one axis less than 200 nm, preferably less than 100 nm, such that they are substantially non-scattering to visible light and the HRI layer is substantially transparent to visible light, and wherein; the particles have a refractive index of at least 1.8 and are present within the host material in a proportion such that the resultant refractive index of the HRI layer is at least 1.6, and wherein; the HRI layer is provided in a different form for at least two of the plurality of security documents.

A particular advantage of the present invention is in the personalisation of security devices and security documents. A plurality of security documents may be provided, each with substantially identical pre-formed surface relief structures, typically diffractive surface relief structures. Such pre-formed surface relief structures may be considered as "blank" surface relief structures in that each pre-formed surface relief exhibits substantially the same optical effect to an observer. By selective provision of a HRI layer onto the blank surface relief structures of each document, a plurality of personalised documents may be produced, with different documents exhibiting different indicia through bright diffractive replay corresponding to the selective provision of the HRI layer. The HRI layer is provided in a different form for at least two of the documents. The different form is typically different indicia. For example, a plurality of passports may be manufactured with different portraits corresponding to the passport holders, the portraits having been printed onto the blank surface relief structures with HRI material. In another example, unique serial numbers may be printed onto a plurality of documents (e.g. banknotes) using the HRI material. Each banknote would then exhibit a different serial number with bright diffractive replay. The ability to selectively provide the HRI layer through digital printing means, such as inkjet printing, is particularly beneficial and allows ease of personalisation.

Typical examples of security documents include a passport, banknote, security label, identification card, driving licence or other document of value.

In accordance with a fourth aspect of the invention there is provided a security device comprising: a security device substrate having a first outwardly facing surface; a high refractive index (HRI) layer selectively provided to said first outwardly facing surface, wherein the HRI layer comprises a substantially transparent host material and particles having a dimension along at least one axis less than 200 nm, preferably less than 100 nm, such that they are substantially non-scattering to visible light and the HRI layer is substantially transparent to visible light, and wherein; the particles have a refractive index of at least 1.8 and are present within the host material in a proportion such that the resultant refractive index of the HRI layer is at least 1.6.

Preferred embodiments of the fourth aspect of the invention are set out in the appended claims and have advantages substantially as discussed above.

According to a fifth aspect of the invention there is provided a security article comprising the security device of the fourth aspect, wherein the security article is one of a security thread, strip, patch, label, transfer foil, paper substrate or a polymer substrate. The security device substrate may comprise at least a part of the substrate of the security article.

In accordance with a sixth embodiment of the invention there is provided a security document comprising a security device according to the fourth aspect, or made in accordance with the first aspect, or a security article according to the fifth aspect of the invention. The security device or article may be located in a transparent window region of the document, or inserted as a window thread, or affixed to a surface of the document. Where the security device or article comprises a polymer substrate, the polymer substrate is typically a laminate for a data page of security document such as a passport or identification card. Another scenario is that the polymer substrate could be the substrate of a polymer banknote i.e. the security device is formed directly on the polymer banknote substrate.

In accordance with a seventh aspect of the invention there is provided a high refractive index (HRI) coating composition for selective provision to a security device substrate, comprising a substantially transparent host material and a dispersion of particles, wherein; a first subset of the particles have a dimension along at least one axis less than 200 nm, preferably less than 100 nm and more preferably less than 50 nm, such that they are substantially non-scattering to visible light, and wherein the first subset of particles have a refractive index of at least 1.8 and are present within the host material in a proportion such that the resultant refractive index of the HRI coating is at least 1.6, and; a second subset of particles have a dimension along at least one axis such that the HRI coating layer exhibits a first colour when viewed in reflection, and a second, different colour when viewed in transmission.

Security device substrates to which such a HRI coating composition may be selectively provided may comprise a surface relief structure, in the manner described above.

BRIEF DESCRIPTION OF THE DRAWINGS

The invention will now be described with reference to the attached drawings, in which:

FIG. 1 is a schematic plan view of a security document comprising a security device according to an embodiment of the present invention;

FIGS. 2a to 2c schematically outline the steps of producing a security device according to an embodiment of the invention;

DETAILED DESCRIPTION OF THE DRAWINGS

Figure 3:
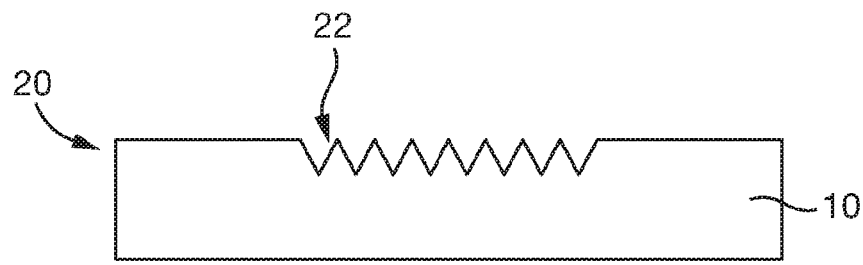
FIG. 3 schematically illustrates an example substrate comprising a surface relief.

The following description will refer to an HRI layer comprising nanocrystalline particles of Titanium dioxide. However, as has been highlighted above, the skilled person will understand that particles of other metal oxides such as alumina, zirconia, zinc oxide or mixed oxides thereof may be used to generate the high refractive index of the HRI layer.

FIG. 1 is a schematic plan view of a security document 100, in this case a banknote. The banknote comprises a substrate 10, which may comprise paper or polymer, and a security device 20. The security device 20 comprises a diffractive optically variable element, in this particular example displaying "£" symbol that exhibits an optically variable effect (e.g. different diffractive colours at different viewing angles of the document 100). Other possible security devices and information present on the substrate 10 of the banknote 100 have been omitted from FIG. 1 for clarity purposes.

FIGS. 2a to 2c schematically outline the steps of producing such a security device 20. FIG. 2a is a cross sectional view of the security device 20 along X-X'. In this example the substrate of the security device 20 is a polymer and is a part of the polymer substrate of the banknote 100 itself. In other examples, the substrate of the security device 20 may be a substantially transparent polymer integrated into a half-window or through-window of a paper banknote. As schematically illustrated in FIG. 2a, at step 1 a substrate comprising a diffractive surface relief structure 22 is provided. The surface relief may have been provided by methods known in the art, such as embossing. In this example, the diffractive surface relief structure is a diffraction grating 22, such as a square grating, sinusoidal grating, sawtooth grating or blazed grating (although other types of structure or envisaged) that exhibits different diffractive colours at different viewing angles. In other examples, the diffractive surface relief structure may be a hologram surface relief that exhibits an optically variable holographic image comprising a plurality of objects. By selectively providing the HRI layer to such a surface relief, only the desired objects of the holographic image may be exhibited, thus allowing for personalisation.

At step 2, as shown at FIG. 2b, a high refractive index (HRI) layer 30 is selectively provided to the diffraction grating 22. In this example, the HRI layer is selectively provided, by inkjet printing, so as to define the "£" symbol as shown in FIG. 1. As a result, when viewed in reflection, the "£" symbol is exhibited to a viewer due to the selective provision of the HRI layer in this form over the diffraction grating 22. The diffraction grating 22 exhibits bright diffractive reply in the form of the "£" symbol where the HRI layer has been applied.

Although the present example the HRI layer is printed so as to define a "£" symbol, it is envisaged that the HRI layer may be printed so as to define any desired image or indicia, advantageously allowing for a high degree of personalisation of the security element 20.

The material forming the HRI layer comprises nanocrystalline Titanium dioxide particles dispersed within a substantially transparent host material, typically as a colloidal dispersion. In order for the region of the security device 20 comprising the HRI dispersion 30 to exhibit bright diffractive replay, the resultant refractive index of the HRI layer is preferably at least 1.6, more preferably at least 1.8 and most preferably at least 2.0. A preferred range for the resultant refractive index of the HRI layer is 1.7 to 2.2. Titanium dioxide has a refractive index of approximately 2.9, and therefore the material forming the HRI layer comprises approximately 15-20% by weight of Titanium dioxide.

Examples of the substantially transparent host material suitable as a delivery host for inkjet printing include nitrocellulose, acrylics, cellulose acetate butyrate, vinyl chloride copolymers, and polyvinylbutyrate. As has been described above, inkjet printing advantageously provides for ease of personalisation of such a security device 20.

It is important that the HRI layer is substantially transparent to visible light such that the optical effect produced by the relief structure 22 is exhibited to a viewer in reflection. Due to the requirement for the HRI layer to be substantially transparent, the Titanium dioxide particles need to be substantially non-scattering to visible light. Titanium dioxide particles have very low scattering power at dimensions of less than 100 nm, and subsequently the preferred particle size of the Titanium dioxide particles in the dispersion is less than 100 nm, and preferably less than 50 nm.

If the substrate 10 is substantially transparent to visible light, the optical effect produced by the relief structure 22 is also visible in transmitted light.

At step 3, as shown in FIG. 2c, a protective varnish 40 may be applied so as to substantially cover the whole of the relief structure 22 including the selectively provided HRI layer 30. The varnish not only protects the surface relief of the security device but also prevents counterfeiting by contact copying or similar methods as the surface relief 22 is not available at the outer surface of the security device. The varnish 40 may comprise an adhesive.

In the example illustrated in FIGS. 2a to 2c, the surface relief 22 is an outwardly-facing surface relief, protruding from the substrate 10. It is also envisaged that the surface relief may be embedded into the outwardly-facing surface of the substrate 10 (an inwardly-facing surface relief), as schematically illustrated in FIG. 3. The HRI layer and varnish may be applied in the same manner as described above in relation to FIGS. 2a to 2c. Examples of a varnish 40 that may be used in step 3 include components such as urethanes, methacrylates and carboxy-functional terpolymers (such as UCAR™ VMCH and VMCA).

Figure 14A:
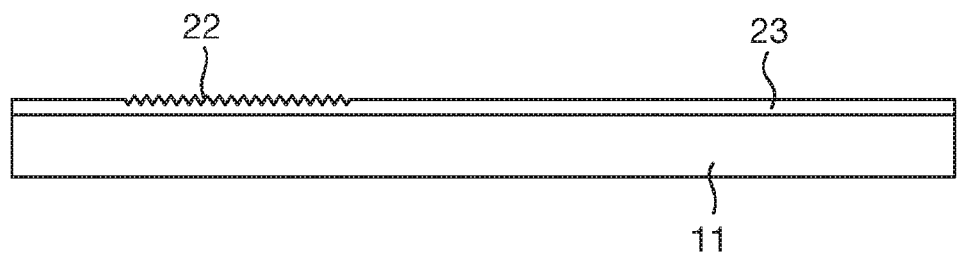
FIGS. 14a, 14b and 14c schematically illustrate example security device substrates to which a HRI layer may be selectively provided.
Figure 14B:
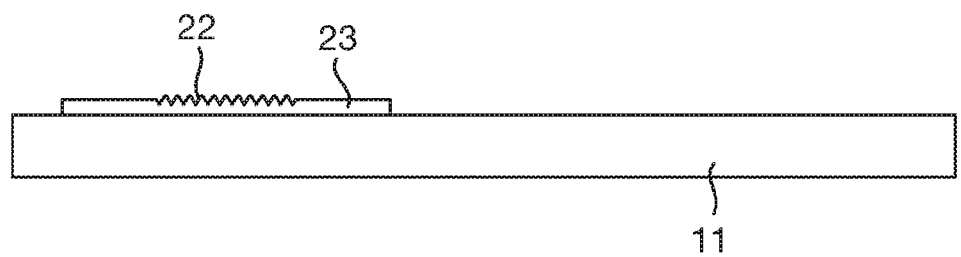
Figure 14C:
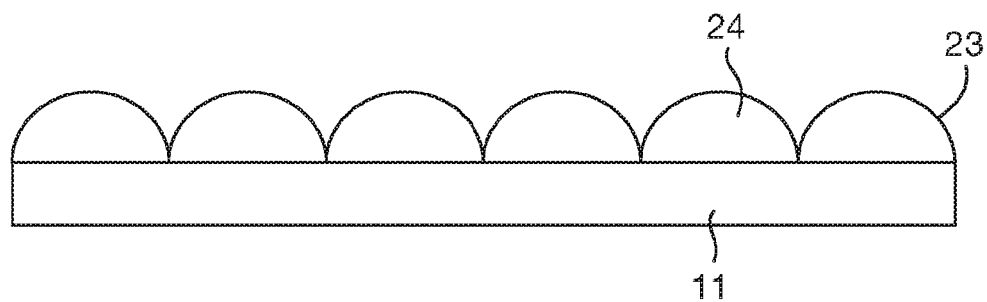

FIGS. 14a to 14c show further examples of security device substrates onto which a HRI layer may be selectively provided. In FIG. 14a, the security device substrate comprises a support layer 11 and an embossing layer 23 disposed upon and covering the support layer. A surface relief 22, such as a diffraction grating, is formed in the embossing layer 23, with the surface relief forming a part of the outwardly facing surface of the security device substrate. In FIG. 14a, the embossing layer substantially completely covers the support layer. FIG. 14b shows a similar security device substrate to that of 14a, where the embossing layer covers only a part of the support layer 11, and the surface relief 22 forms part of the outwardly facing surface of the security device substrate. The HRI layer may then be selectively provided to the surface relief 22.

FIG. 14c schematically illustrates a security device substrate comprising a support layer 11 and an embossing layer 23 comprising a refractive surface relief structure, in this case an array of microlenses 24, to which a HRI layer may be selectively provided. The provision of a HRI layer onto lenses may advantageously allow for the use of thinner lenses to be used, reducing the overall thickness of a security device and associated security document.

In some examples, similarly to as shown in FIG. 3, a surface relief structure may be formed within an outer surface of a support layer, for example by embossing.

The support layer may comprise a polymer material such as polypropylene, polyethylene, polycarbonate, polyvinyl chloride (PVC) and polyethylene terephthalate (PET). Suitable embossing materials include any thermoplastic polymer for example a PMMA based resin. In some cases the support layer of the security device substrate may form a part of a security article or security document.

Although the HRI layer 30 described above in relation to FIGS. 2a to 2c was selectively provided by inkjet printing, other forms of selective provision are envisaged, such as analogue print methods including flexography, lithography or gravure.

Figure 4A:
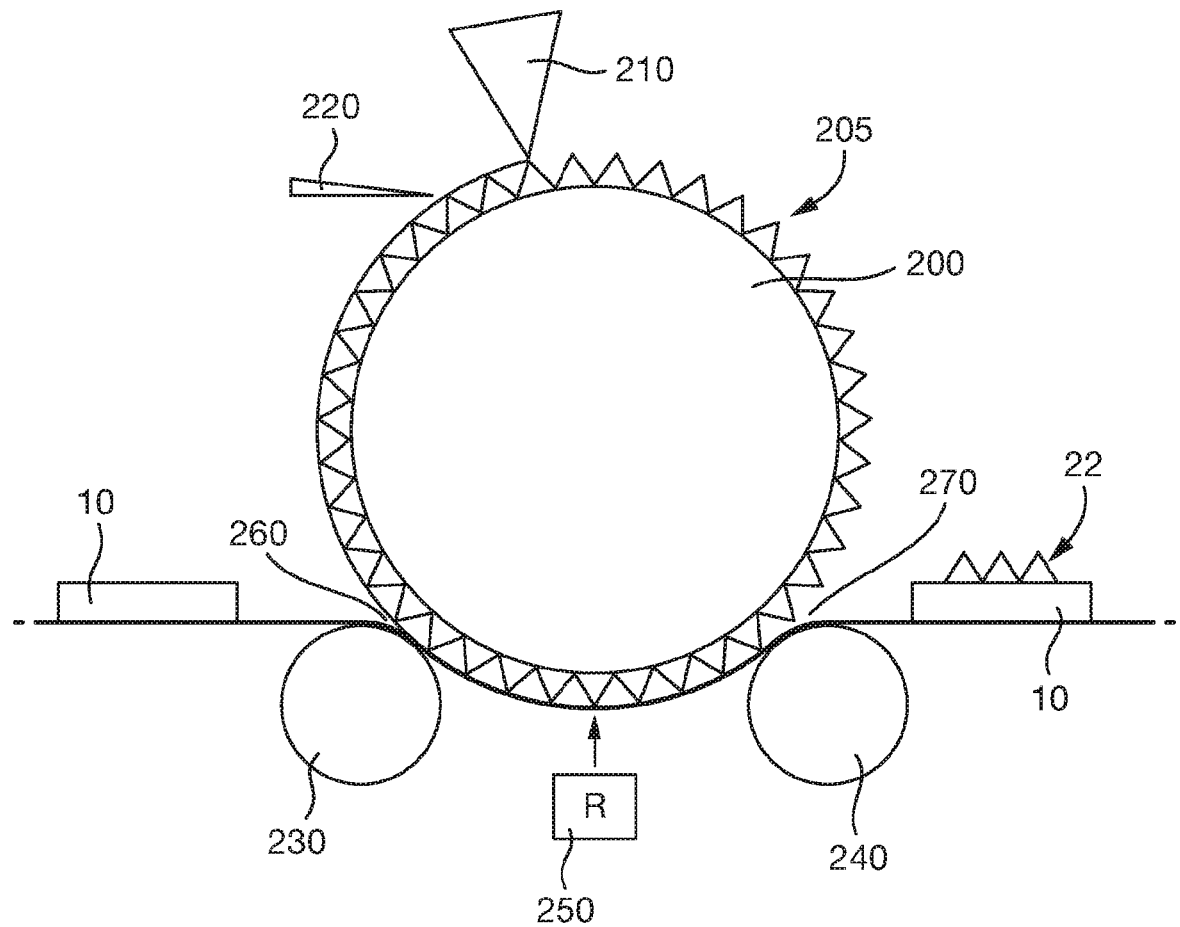
FIGS. 4a to 4c schematically illustrate methods of selectively providing a HRI layer according to embodiments of the invention.
Figure 4B:
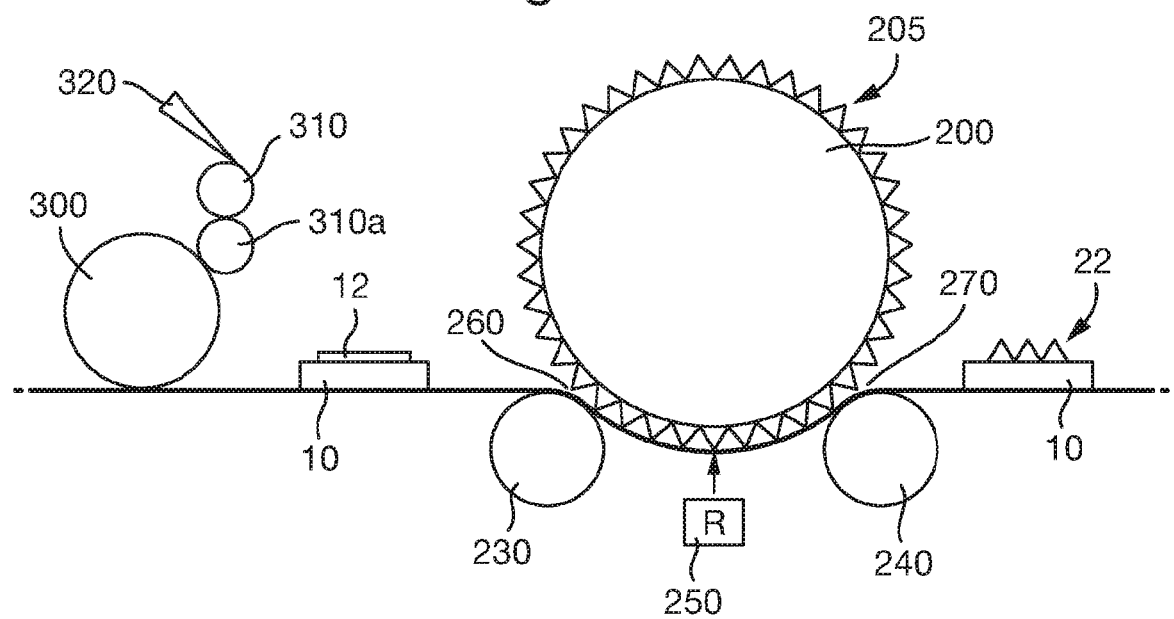
Figure 4C:
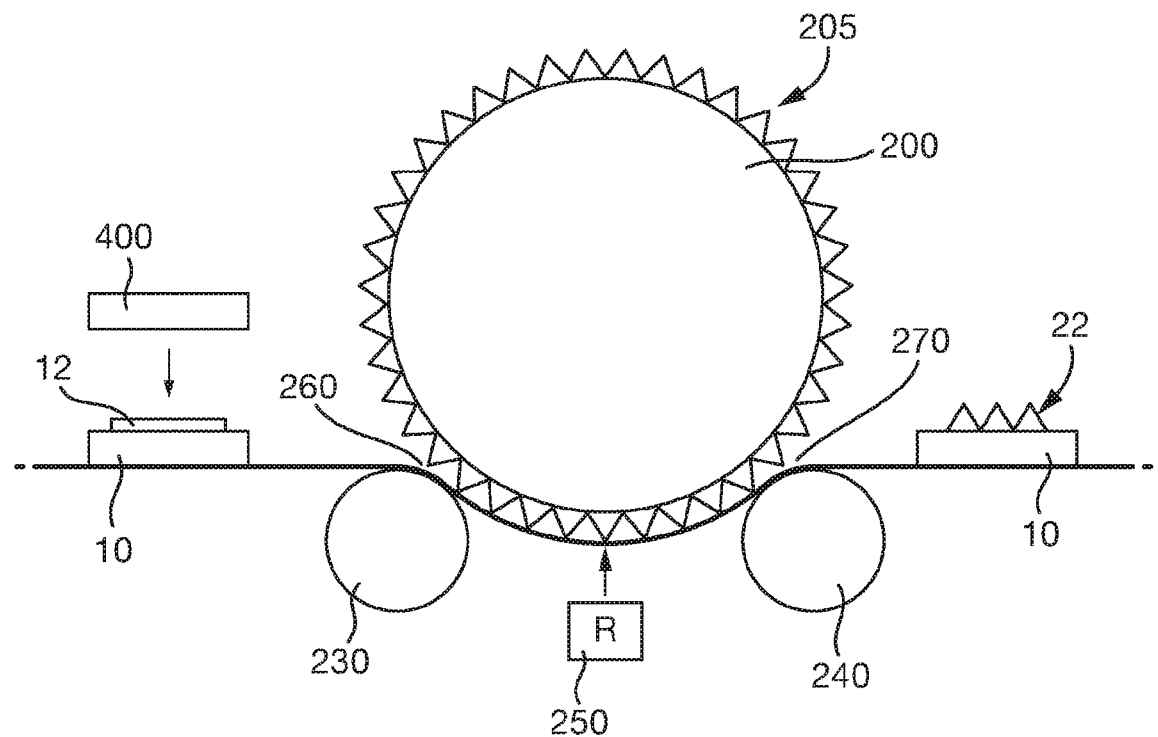

In the embodiments described above, the HRI layer is selectively provided to a pre-formed surface relief structure. In some embodiments, such an HRI material may be used to form a relief structure, as will now be described. FIGS. 4a to 4c schematically illustrate how a relief structure may be formed from an HRI material using radiation curing. Here, nanocrystalline Titanium dioxide particles are dispersed within a suitable radiation-curable host material and the resultant radiation-curable HRI material is selectively provided to a substrate in a manner as described below.

In one embodiment, shown in FIG. 4a, a radiation-curable HRI material is applied to the outer surface of a substantially cylindrical casting cylinder 200 by an applicator 210. The outer surface 205 of the casting cylinder 200 carries the inverse surface relief of the desired surface relief structure. Excess material may be removed by doctor blade 210 if desired, for example in the formation of refractive structures.

A substrate 10, such as a polymer substrate for a banknote, is then introduced to a nip 260 defined between the casting cylinder 200 and a first impression roller 230, such that the material on the casting cylinder is transferred to the substrate 10. Having been formed into the correct surface relief structure, the curable HRI material is cured by exposing it to appropriate curing energy such as radiation R from a source 250. This preferably takes place while the curable HRI material is in contact with the surface relief of the casting cylinder, although if the material is already sufficiently viscous this could be performed after separation. In the example shown, the curable HRI material is irradiated through the substrate 10, although the source 250 could alternatively be positioned above the substrate 10, e.g. inside cylinder 200 if the cylinder is formed from a suitable transparent material such as quartz.

The substrate 10, now comprising the cured HRI material, passes through second nip 270 defined by second impression roller 240 and the casting cylinder 200. The HRI surface relief structure 22, now affixed to the substrate 10, separates from the casting cylinder such that device 100 is formed. In this example, the curable HRI material was applied directly to a document substrate (e.g. a polymer banknote substrate), although in other embodiments curable HRI material may be applied to a substrate for subsequent integration into a security document (for example through the use of a half-window of full window).

FIG. 4b illustrates a further example of manufacturing such a security device using a flexographic process. Substrate 10 is provided to a transfer roller 300, where a curable HRI material is provided by applicator roller 310 via respective annilox roller 310a. A doctor blade (illustrated at 320) may optionally be used to remove excess material from the applicator roller 310. Optionally, a doctor blade may be used to remove excess material from the annilox roller 310a. The substrate 10, now comprising the curable HRI material 12, is subsequently introduced to casting cylinder 200, wherein the outer surface 205 of the casting cylinder comprises the inverse surface relief of the desired security device surface relief.

The substrate 10 passes through first nip 260 defined by impression roller 230 and casting cylinder 200 to form the desired surface relief in the curable HRI material, wherein subsequently the curable HRI material is cured by radiation R in the same manner as described above in relation to FIG. 4a. This preferably takes place while the curable HRI material is in contact with the surface relief 205 of the casting cylinder, although if the material is already sufficiently viscous this could be performed after separation. In the example shown, the material is irradiated through the substrate 10 although the source 250 could alternatively be positioned above the substrate 10, e.g. inside cylinder 200 if the cylinder is formed from a suitable transparent material such as quartz.

The substrate, now comprising the cured HRI material in the form of the desired surface relief, passes through second nip 270 defined by second impression roller 240, and the surface relief structure 22, now affixed to the substrate 10, separates from the casting cylinder such that device 100 is formed.

FIG. 4c shows a further example of manufacturing such a security device, this time using inkjet printing for selectively providing an initial layer of curable HRI resin 12 to substrate 10. Here, substrate 10 is presented to a print head 400 used to provide the curable HRI material to the substrate 10, before the substrate 10, now comprising the curable material 12, is subsequently introduced to casting cylinder 200, wherein the outer surface 205 of the casting cylinder comprises the inverse surface relief of the desired surface relief. The HRI material is cured and the security device 20 is formed in the same way as described above in FIGS. 4a and 4b.

The use of inkjet printing advantageously allows the arrangement of the curable HRI material to be changed quickly and easily. For example, one security device may be printed so as the HRI surface relief structure is in the form of first indicia, and a different security device may be printed where the HRI surface relief structure is in the form of a second, different indicia. This has particular advantages in personalising security devices.

The radiation used to effect curing in the examples described above is typically UV radiation but could comprise electron beam, visible, or even infra-red or higher wavelength radiation, depending upon the material, its absorbance and the process used. Examples of suitable curable materials to which HRI particles may be provided include UV curable acrylic based clear embossing lacquers or those based on other compounds such as nitro-cellulose.

The resultant refractive index of the curable HRI material is preferably at least 1.6, more preferably at least 1.8 and most preferably at least 2.0. A preferred range for the resultant refractive index of the HRI layer is 1.7 to 2.2. Titanium dioxide has a refractive index of approximately 2.9, and is therefore the curable HRI material comprises approximately 15-20% by weight of Titanium dioxide.

The curable material could be elastomeric and therefore of increased flexibility. An example of a suitable elastomeric curable material is aliphatic urethane acrylate (with suitable cross-linking additive such as polyaziridine).

In other embodiments, the surface relief 22 may be formed by embossing rather than radiation curing, in which case the Titanium dioxide nanocrystalline particles are added to a suitable embossing material, and the surface relief structures embossed as is known in the art. Suitable embossing materials include any thermoplastic polymer for example a PMMA based resin.

The surface relief structure 22 formed by the embossing or radiation curing procedures outlined above may be diffractive relief structures. In other embodiments, the relief structures may comprise lenses or other refraction-based structures such as microprisms. Further examples of such structures include corner cubes and pyramidal structures. Typically, such structures are formed as an array.

Figure 5:
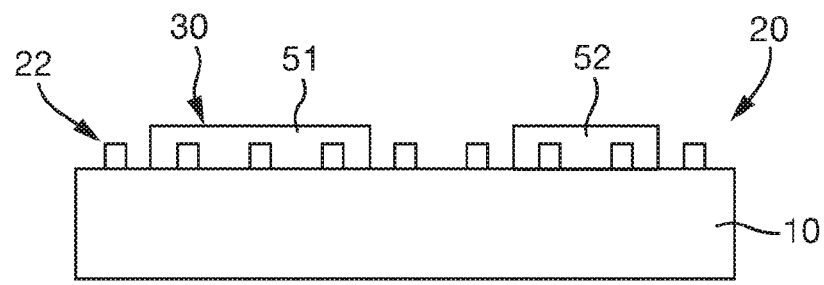
FIGS. 5 and 6 are schematic cross-sectional views of security devices according to further embodiments of the invention.

FIG. 5 is a schematic cross-sectional view of a security device 20 according to a further embodiment of the invention. Here, the selectively provided HRI layer comprises two different coloured regions, indicated at 51 and 52. Region 51 comprises a dispersion of high refractive index Titanium dioxide nanocrystalline particles in the manner described above, together with a first colourant, such that region 51 exhibits a first colour to a viewer 50. Similarly, region 52 comprises a dispersion of high refractive index Titanium dioxide nanocrystalline particles, together with a second colourant, such that region 52 exhibits a second colour, different from the first colour. The colour exhibited by a coloured region of the HRI layer is due to the absorption, by the colourant, of a particular wavelength, or range of wavelengths, of visible light. The colourant used in a coloured region of the HRI layer may be a pigment or a dye.

The colourant used preferably has a particle dimension along at least one axis less than 100 nm, more preferably less than 50 nm such that the colourant particles are substantially non-scattering to visible light. A coloured region of the HRI layer comprising such a colourant is thus substantially transparent (which includes translucent) and exhibits substantially the same colour when the device 20 is viewed in reflection and transmission. For the purposes of this discussion, the coloured region will be referred to as having a coloured "tint".

The use of colourant(s) in the HRI layer advantageously provides a memorable optical effect to a viewer. Although the example shown in FIG. 5 shows two different coloured regions 51 and 52, it will be appreciated that both regions 51 and 52 may comprise the same colourant and therefore exhibit substantially the same colour. Furthermore, one, or three or more, coloured regions of the HRI layer may be used.

Such coloured HRI inks may be selectively applied (in appropriate register where necessary) to the surface relief 22 by inkjet printing, or analogue methods such as lithography, flexographic or gravure printing.

Figure 6:
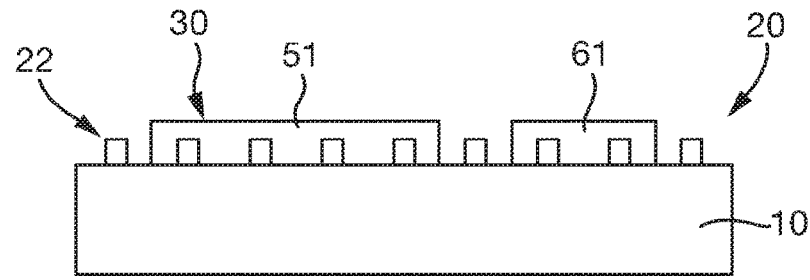
Figure 7A:
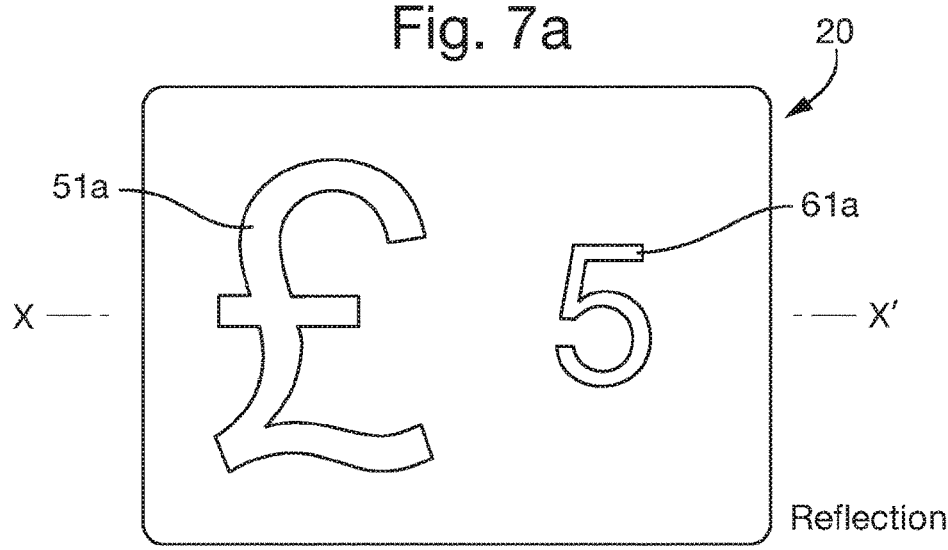
FIGS. 7a and 7b schematically illustrate the visual effect exhibited by a security device according to an embodiment of the invention.
Figure 7B:
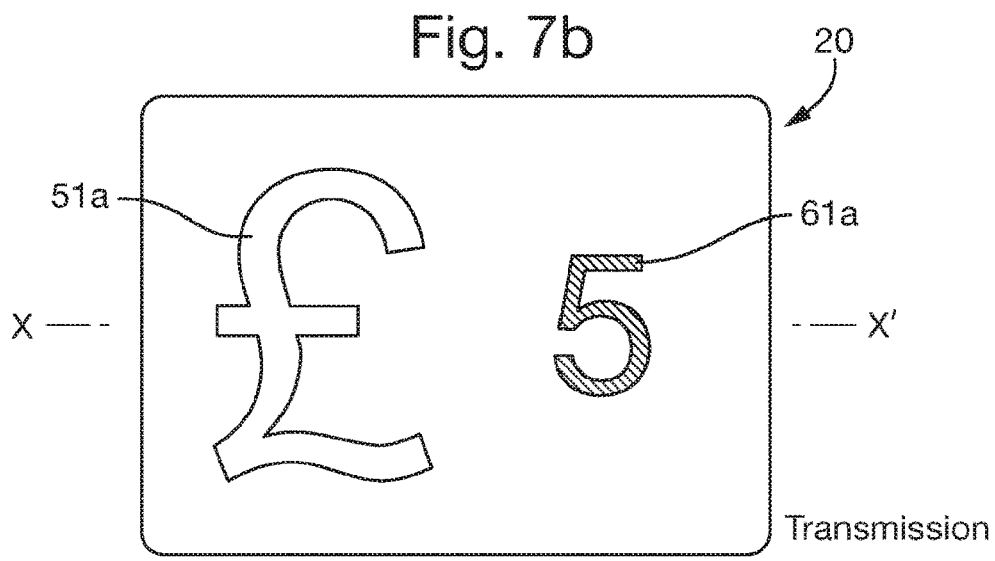

FIG. 6 is a schematic cross-sectional view of a security device 20 according to a further embodiment of the invention. Here, the HRI layer is selectively provided to a surface relief structure 22 and comprises a coloured region 51 and a Tyndall-effect region 61. As schematically illustrated in FIGS. 7a and 7b, which show the security device 20 in plan view when viewed in reflection and transmission, respectively, the coloured region 51 is provided in the form of a "£" symbol, and the Tyndall-effect region 62 is provided in the form of a "5" symbol. The cross-section of FIG. 6 is taken along the line X-X' in FIGS. 7a and 7b. The surface relief 22 is a diffractive surface relief structure.

The coloured region 51 is as described above in relation to FIG. 5. The Tyndall-effect region 61 comprises high refractive index Titanium dioxide nanocrystalline particles dispersed within a substantially transparent host material, and further comprises a dispersion of particles having a dimension such that the Tyndall-effect region exhibits the Tyndall effect.

The Tyndall effect is the effect of light scattering by particles having a dimension below or substantially equal to the wavelength of the incident light. Shorter wavelength light is reflected due to scattering from these particles, whereas longer wavelength light is substantially transmitted through the medium. Therefore, when viewing the Tyndall-effect region 62 in reflected visible light, the "5" will appear blue (due to the shorter wavelength blue light of the visible spectrum being reflected), and in transmitted light the "5" will appear orange (due to the longer wavelengths of the visible spectrum being transmitted).

This is schematically illustrated in FIGS. 7a and 7b. FIG. 7a shows the security device 20 in plan form when viewed in reflection. The coloured region 51 comprises a blue colourant and has been selectively provided over the diffractive surface relief structure 22 in the form of a "£" symbol, shown at 51a. The security device therefore exhibits a diffractive optically variable effect having a blue tint, in the form of a "£" symbol. The Tyndall-effect region 61 has been provided in the form of a "5", shown at 61a. In reflection, the security device 20 therefore exhibits a diffractive optically variable effect having a blue tint, in the form of a "5" symbol.

However, when viewed in transmission, although the "£" symbol will maintain its blue tint, the "5" symbol will exhibit an orange tint due to the Tyndall effect. This change in colour between reflective and transmissive viewing provides a striking optical effect to the viewer and enhances the security properties of the device 20.

Typically the individual particles of the dispersion exhibiting the Tyndall effect have a dimension in the range of 100-900 nm, typically 200-700 nm dependent on the material.

Figure 8:
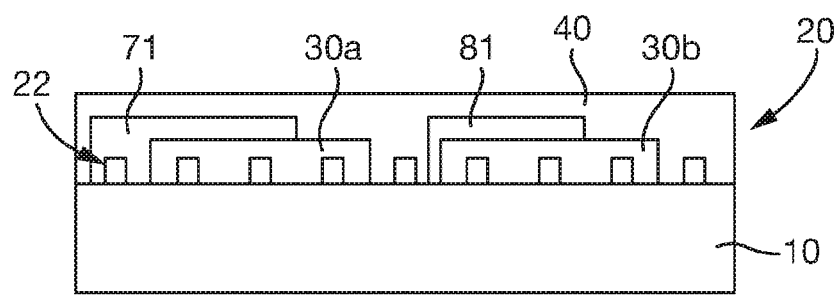
FIG. 8 is a schematic cross-sections view of a security device according to a further embodiment of the invention.
Figure 9A:
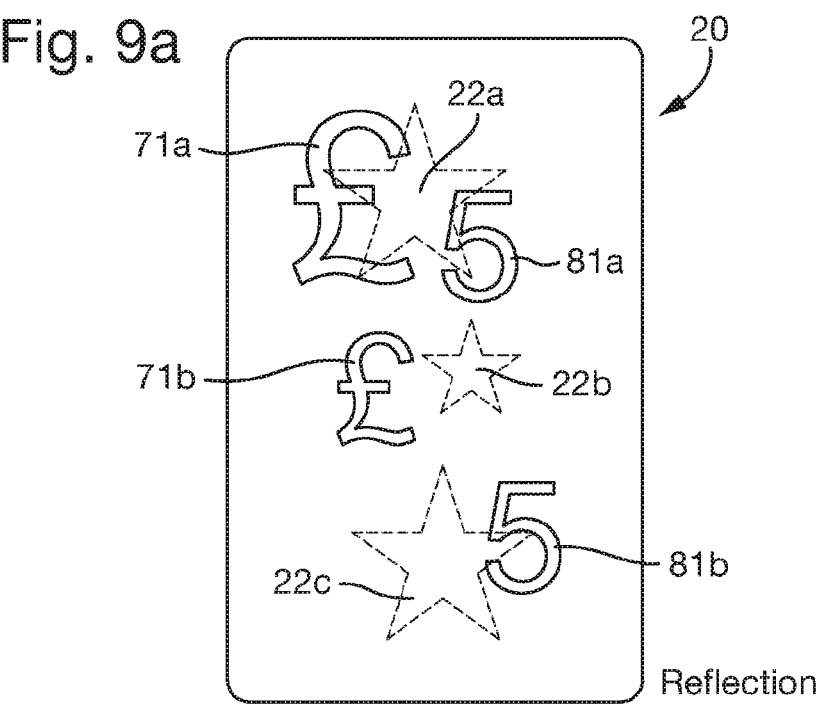
FIGS. 9a and 9b schematically illustrate the visual effect exhibited by a security device according to an embodiment of the invention.
Figure 9B:
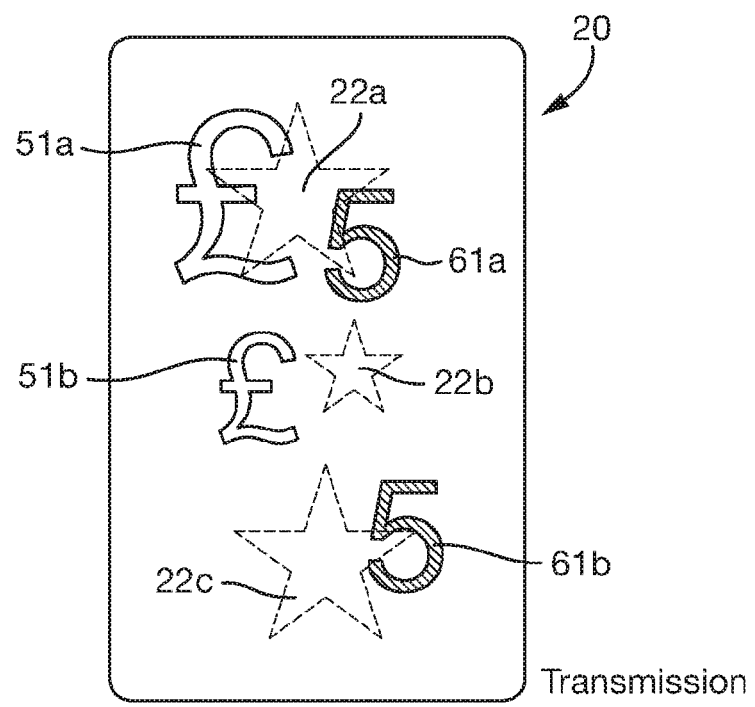

FIG. 8 is a schematic cross-sectional view of a security device 20 according to a further embodiment of the invention, where an optical effect layer is selectively provided to the HRI layer 30. FIGS. 9a and 9b schematically represent the effect exhibited by such a device when viewed in reflection and transmission, respectively.

As seen in FIG. 8, the device 20 comprises a substantially transparent substrate 10 and a diffractive surface relief structure 22, in a similar manner to the embodiments described above. A substantially transparent HRI layer comprising regions 30a and 30b is selectively provided to the surface relief 22. As shown in FIGS. 9a and 9b, the HRI is selectively provided so as to define the star-shaped diffractive structures shown at 22a, 22b and 22c.

The optical effect layer comprises regions 71 and 81, and is selectively provided so as to at least partially overlap with the regions 30a and 30b of the HRI layer, as illustrated in FIG. 8. A protective substantially transparent varnish 40 is provided over the diffractive surface relief structure of the security element 20. The varnish may comprise an adhesive.

Region 71 of the optical effect layer comprises a (in this case blue) colourant, such as a dye or pigment, and is substantially transparent to visible light in a similar manner to as described above. Region 71 is selectively provided in the form of two "£" symbols, illustrated at 71a and 71b. Region 81 of the optical effect layer comprises a dispersion of Tyndall-effect particles such that it exhibits the Tyndall effect, and is selectively provided in the form of two "5" symbols, as illustrated at 81a and 81b.

When viewed in reflection, both regions 71 and 81 of the optical effect layer exhibit a blue colour. As schematically illustrated in FIG. 9a, the "£" symbol 71a and "5" symbol 81a partially overlap with diffractive structure 22a, providing a blue tint to the diffractive structure in the regions of overlap. When viewed in transmission however, while the "£" symbols defined by the colourant region 71 maintain their blue exhibited colour, the "5" symbols now exhibit an orange colour due to the Tyndall effect generated by region 81 of the optical effect layer.

Security devices of the sort described above can be incorporated into or applied to any article for which an authenticity check is desirable. In particular, such devices may be applied to or incorporated into documents of value such as banknotes, passports, driving licences, cheques, identification cards etc.

The security device or article can be arranged either wholly on the surface of the base substrate of the security document, as in the case of a stripe or patch, or can be visible only partly on the surface of the document substrate, e.g. in the form of a windowed security thread. Security threads are now present in many of the world's currencies as well as vouchers, passports, travellers' cheques and other documents. In many cases the thread is provided in a partially embedded or windowed fashion where the thread appears to weave in and out of the paper and is visible in windows in one or both surfaces of the base substrate. One method for producing paper with so-called windowed threads can be found in EP-A-0059056. EP-A-0860298 and WO-A-03095188 describe different approaches for the embedding of wider partially exposed threads into a paper substrate. Wide threads, typically having a width of 2 to 6 mm, are particularly useful as the additional exposed thread surface area allows for better use of optically variable devices, such as that presently disclosed.

The security device or article may be subsequently incorporated into a paper or polymer base substrate so that it is viewable from both sides of the finished security substrate. Methods of incorporating security elements in such a manner are described in EP-A-1141480 and WO-A-03054297. In the method described in EP-A-1141480, one side of the security element is wholly exposed at one surface of the substrate in which it is partially embedded, and partially exposed in windows at the other surface of the substrate.

Base substrates suitable for making security substrates for security documents may be formed from any conventional materials, including paper and polymer. Techniques are known in the art for forming substantially transparent regions in each of these types of substrate. For example, WO-A-8300659 describes a polymer banknote formed from a transparent substrate comprising an opacifying coating on both sides of the substrate. The opacifying coating is omitted in localised regions on both sides of the substrate to form a transparent region. In this case the transparent substrate can be an integral part of the security device or a separate security device can be applied to the transparent substrate of the document. WO-A-0039391 describes a method of making a transparent region in a paper substrate. Other methods for forming transparent regions in paper substrates are described in EP-A-723501, EP-A-724519, WO-A-03054297 and EP-A-1398174.

The security device may also be applied to one side of a paper substrate so that portions are located in an aperture formed in the paper substrate. An example of a method of producing such an aperture can be found in WO-A-03054297. An alternative method of incorporating a security element which is visible in apertures in one side of a paper substrate and wholly exposed on the other side of the paper substrate can be found in WO-A-2000/39391.

Examples of such documents of value and techniques for incorporating a security device will now be described with reference to FIGS. 10 to 13.

Figure 10A:
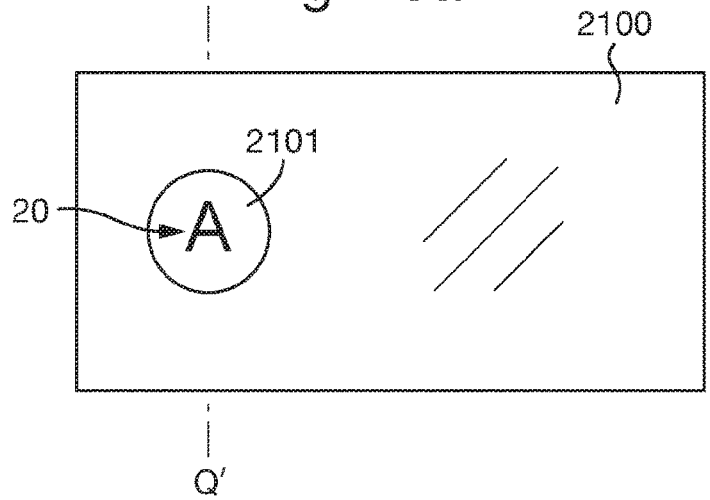
FIGS. 10 to 13 illustrate example documents of value and methods for integrating a security device into said documents of value.
Figure 10B:
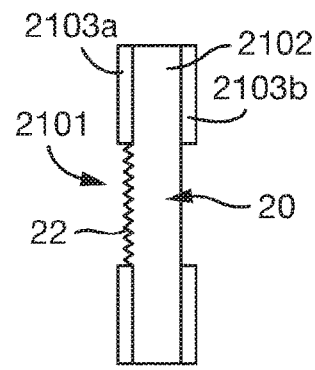

FIG. 10 depicts an exemplary document of value 2100, here in the form of a banknote. FIG. 10a shows the banknote in plan view whilst FIG. 10b shows the same banknote in cross-section along the line Q-Q'. In this case, the banknote is a polymer (or hybrid polymer/paper) banknote, having a transparent substrate 2102. Two opacifying layers 2103a and 2103b are applied to either side of the transparent substrate 2102, which may take the form of opacifying coatings such as white ink, or could be paper layers laminated to the substrate 2102.

Figure 11A:
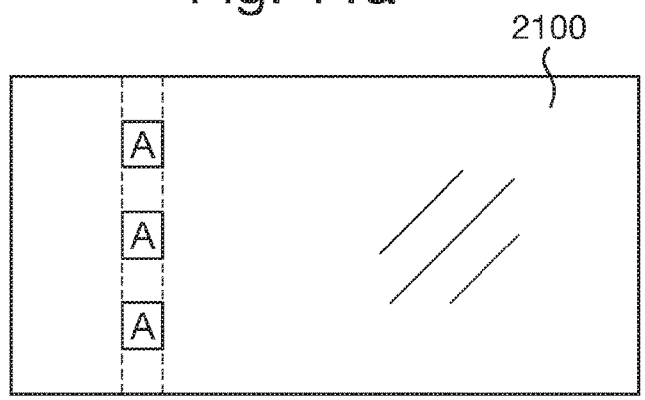
Figure 11B:
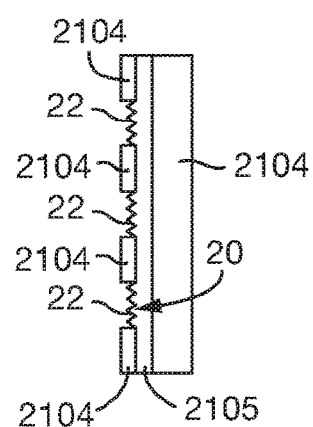

The opacifying layers 2103a and 2103b are omitted across an area 2101 which forms a window within which the security device 20 is located. As shown best in the cross-section of FIG. 10, a diffractive surface relief 22 is provided on one surface of the substrate 2102. This is typically pre-formed. A HRI layer is selectively provided to the diffractive surface relief structure 22 as described above with respect to any of the disclosed embodiments, such that the device 20 displays bright diffractive replay in window 2101 where the HRI layer has been provided. Here the HRI layer is selectively provided in the form of the character "A". The device 20 may be viewed in transmission or reflection due to the transparent nature of the substrate 2102. It should be noted that in modifications of this embodiment the window 2101 could be a half-window with the opacifying layer 2103b continuing across all or part of the window. The banknote may also comprise a series of windows or half-windows. In this case different areas displayed by the security device could appear in different ones of the windows, with different optical effects provided by selective printing of the HRI layer in different windows, FIG. 11 shows such an example, although here the banknote 2100 is a conventional paper-based banknote provided with a security article 2105 in the form of a security thread, which is inserted during paper-making such that it is partially embedded into the paper so that portions of the paper 2104 lie on either side of the thread. This can be done using the techniques described in EP0059056 where paper is not formed in the window regions during the paper making process, thus exposing the security thread incorporated between layers of the paper. The security thread 2105 is exposed in window regions 2101 of the banknote. Alternatively the window regions 2101 may for example be formed by abrading the surface of the paper in these regions after insertion of the thread. The security device 20 is formed on the thread 2105, which comprises a transparent substrate with pre-formed diffractive relief structures 22 visible in the window regions 2101. The HRI layer is selectively provided, preferably by inkjet printing, to the diffractive relief structures. As seen in FIG. 11a, the HRI layer is selectively printed in the form of an "A" in each window region, although it will be appreciated that it may be printed so as to define different indicia in each window. Such flexibility in the provision of the HRI layer to the pre-formed diffractive relief structures is a particular advantage of the present invention, allowing ease of personalisation of security documents.

Figure 12A:
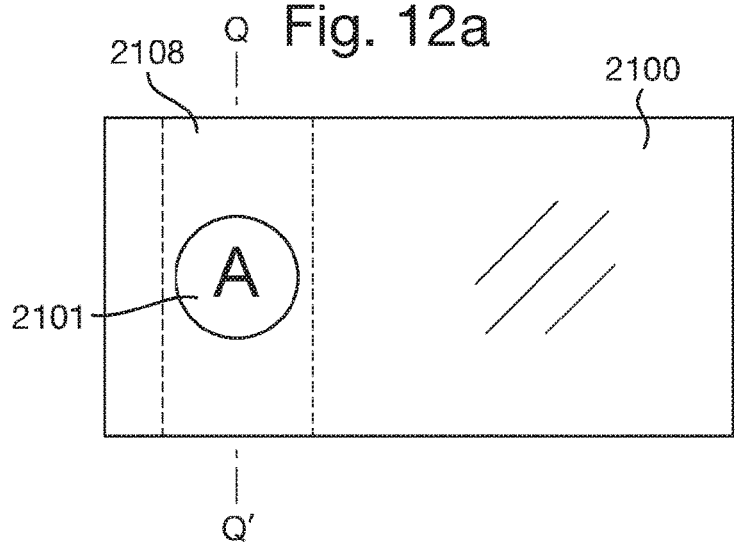
Figure 12B:
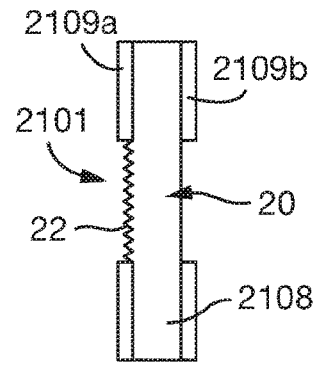

In FIG. 12, the banknote 2100 is again a conventional paper-based banknote, provided with a strip element or insert 2108. The strip 2108 is based on a transparent substrate and is inserted between two plies of paper 2109a and 2109b. The strip 2108 comprises a pre-formed diffractive surface relief structure 22 and the security device 20 is formed by selectively providing a HRI layer to the relief structure 22. The paper plies 2109a and 2109b are apertured across region 2101 to reveal the security device 20, which in this case may be present across the whole of the strip 2108 or could be localised within the aperture region 2101.

Figure 13A:
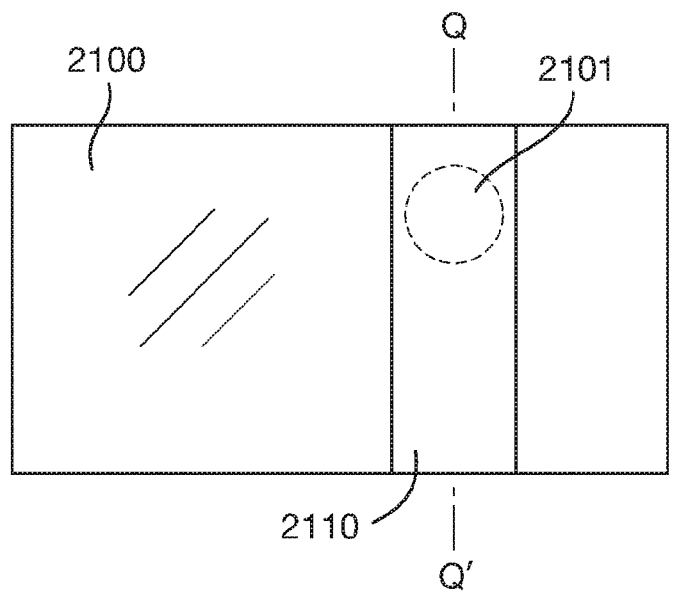
Figure 13B:
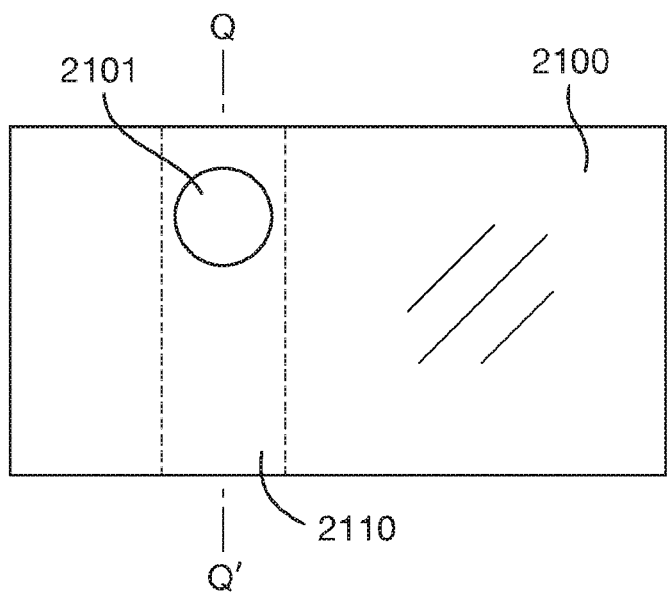
Figure 13C:
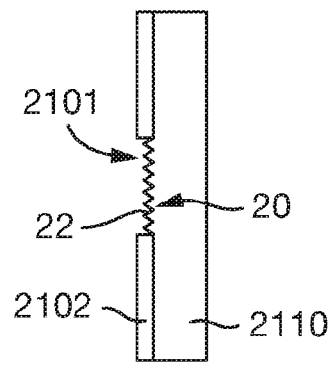

A further embodiment is shown in FIG. 13 where FIGS. 13(a) and (b) show the front and rear sides of the document 2100 respectively, and FIG. 13(c) is a cross section along line Q-Q'. Security article 2110 is a strip or band comprising a security device 20 according to any of the embodiments described above. The security article 2110 is formed into a security document 2100 comprising a fibrous substrate 2102, using a method described in EP-A-1141480. The strip is incorporated into the security document such that it is fully exposed on one side of the document (FIG. 13(a)) and exposed in one or more windows 2101 on the opposite side of the document (FIG. 13(b)). Again, the security device 20 is formed on the strip 2110, which comprises a transparent substrate with a pre-formed diffractive surface relief structure 22 on one surface. The HRI layer is selectively provided to the relief structure 22.

In FIG. 13, the document of value 2100 is again a conventional paper-based banknote and again includes a strip element 2110. In this case there is a single ply of paper. Alternatively a similar construction can be achieved by providing paper 2102 with an aperture 2101 and adhering the strip element 2110 on to one side of the paper 2102 across the aperture 2101. The aperture may be formed during papermaking or after papermaking for example by die-cutting or laser cutting.

In the examples described above in reference to FIGS. 10 to 13, the HRI layer is selectively provided to a diffractive surface relief structure pre-formed on the transparent substrate. However, this is for illustrative purposes, and the security device 20 of FIGS. 10 to 13 may be as described in any of the above embodiments.

As a further example, a plastic datapage for a passport may be provided with a pre-formed diffractive surface relief structure (for example formed by embossing), and the HRI layer is selectively provided to the diffractive surface relief structure in the region(s) desired to exhibit bright diffractive replay. This desired region may be a portrait of the passport holder, for example. In this manner a plurality of personalised passports may be manufactured.

The invention claimed is:

1. A method of forming a security device, the method comprising:
    selectively providing a high refractive index (HRI) layer to a first outwardly facing surface of a security device substrate, the HRI layer comprising a substantially transparent host material and particles having a dimension along at least one axis less than 200 nm, such that the particles are substantially non-scattering to visible light and the HRI layer is substantially transparent to visible light;
    wherein the particles have a refractive index of at least 1.8 and are present within the host material in a proportion such that a resultant refractive index of the HRI layer is at least 1.6, and
    wherein the first outwardly facing surface of the security device substrate comprises a surface relief structure, and the HRI layer is selectively provided to the surface relief structure.

2. The method of claim 1, wherein the particles comprise at least one metal oxide selected from: titanium dioxide, alumina, zirconia, zinc oxide, or mixed oxides thereof.

3. The method of claim 1, wherein the resultant refractive index of the HRI layer is in a range of 1.6 to 2.5.

4. The method of claim 1, wherein the selectively providing the HRI layer is performed by a printing process.

5. The method of claim 4, wherein the printing process is one of inkjet printing, flexographic printing or gravure printing.

6. The method of claim 1, wherein the HRI layer further comprises a colorant such that the HRI layer exhibits a first color to a viewer.

7. The method of claim 1, wherein the HRI layer further comprises a dispersion of scattering particles having a dimension along at least one axis such that the HRI layer exhibits a first color when viewed in reflection and a second, different color when viewed in transmission.

8. The method of claim 7, wherein the scattering particles of the dispersion have a dimension D along at least one axis substantially according to $$D = 2\lambda/\pi(n_1 - n_2);$$

wherein $\lambda$ is a wavelength of light incident on the HRI layer, $n_1$ is a refractive index of the particles and $n_2$ is a refractive index of the host material.

9. The method of claim 1, further comprising selectively providing an optical effect layer to the HRI layer.

10. The method of claim 9, wherein the optical effect layer comprises a colorant such that the optical effect layer exhibits a first color to a viewer, or wherein the optical effect layer comprises a dispersion of scattering particles having a dimension along at least one axis such that the optical effect layer exhibits a first color when viewed in reflection, and a second, different color when viewed in transmission.

11. The method of claim 1, wherein the surface relief structure is a diffractive surface relief structure.

12. The method of claim 11, wherein the diffractive surface relief structure is a hologram surface relief or a diffraction grating.

13. The method of claim 1, wherein the surface relief structure comprises at least one refractive structure, and the HRI layer is selectively provided to said at least one refractive structure.

14. The method of claim 13, wherein the at least one refractive structure is a lens or microprism.

15. The method of claim 1, wherein the HRI layer is selectively provided so as to define indicia.

16. The method of claim 1, wherein the security device substrate comprises one of a security thread, strip, patch, label, transfer foil, paper substrate or a polymer substrate.

17. A method of manufacturing a plurality of security devices, wherein each security device is manufactured according to the method of claim 1 and wherein the HRI layer is selectively provided in a different form for at least two of the plurality of security devices.

18. The method of claim 1, wherein the particles have a dimension along at least one axis less than 100 nm.

19. A method of manufacturing a plurality of security documents, the method of manufacturing each document comprising the steps of:
    providing a security document substrate comprising a diffractive or refractive surface relief structure, and;
    selectively providing a high refractive index (HRI) layer to said diffractive or refractive surface relief structure, the HRI layer comprising a substantially transparent host material and particles having a dimension along at least one axis less than 200 nm, such that the particles are substantially non-scattering to visible light and the HRI layer is substantially transparent to visible light;
    wherein the particles have a refractive index of at least 1.8 and are present within the host material in a proportion such that a resultant refractive index of the HRI layer is at least 1.6, and
    wherein the HRI layer is provided in a different form for at least two of the plurality of security documents.

20. A security device comprising:

a security device substrate having a first outwardly facing surface;

a high refractive index (HRI) layer selectively provided to said first outwardly facing surface, wherein the HRI layer comprises a substantially transparent host material and particles having a dimension along at least one axis less than 200 nm, such that the particle are substantially non-scattering to visible light and the HRI layer is substantially transparent to visible light;

wherein the particles have a refractive index of at least 1.8 and are present within the host material in a proportion such that a resultant refractive index of the HRI layer is at least 1.6, and wherein the first outwardly facing surface of the security device substrate comprises a surface relief structure, and the HRI layer is selectively provided to said surface relief structure.

* * * * *